(12) United States Patent
Ihde et al.

(10) Patent No.: US 7,323,659 B2
(45) Date of Patent: Jan. 29, 2008

(54) SYSTEM AND METHOD OF PRECISE WIRE FEED CONTROL IN A WELDER

(75) Inventors: Jeffery R. Ihde, Greenville, WI (US); Brian L. Ott, Hilbert, WI (US)

(73) Assignee: Illinois Tool Works Inc., Glenview, IL (US)

( * ) Notice: Subject to any disclaimer, the term of this patent is extended or adjusted under 35 U.S.C. 154(b) by 521 days.

(21) Appl. No.: 10/711,606

(22) Filed: Sep. 28, 2004

(65) Prior Publication Data

US 2006/0070986 A1  Apr. 6, 2006

(51) Int. Cl.
*B23K 9/133* (2006.01)
(52) U.S. Cl. .................................. 219/137.71
(58) Field of Classification Search ........... 219/137.71, 219/137.7, 137.2
See application file for complete search history.

(56) References Cited

U.S. PATENT DOCUMENTS

| | | | | |
|---|---|---|---|---|
| 3,586,222 A | * | 6/1971 | Rosen | ................... 219/137.71 |
| 5,932,123 A | * | 8/1999 | Marhofer et al. | ...... 219/137.71 |
| 6,661,192 B2 | | 12/2003 | Copeland | |
| 2004/0016735 A1 | | 1/2004 | Huismann et al. | |
| 2004/0016736 A1 | | 1/2004 | Huismann et al. | |
| 2004/0016737 A1 | | 1/2004 | Huismann et al. | |
| 2004/0016788 A1 | | 1/2004 | Huismann et al. | |
| 2004/0245230 A1 | | 12/2004 | Huismann et al. | |

* cited by examiner

*Primary Examiner*—Clifford C. Shaw
(74) *Attorney, Agent, or Firm*—Ziolkowski Patent Solutions Group, SC

(57) ABSTRACT

The present invention is directed to an apparatus and method for a welding-type wire feeder. The feeder includes at least one electronically commutated motor (ECM) configured to deliver a consumable for a welding-type process. The feeder includes a controller configured to electronically commutate the at least one ECM so as to precisely perform push and pull functions, speed and acceleration control, and wire reversal.

35 Claims, 5 Drawing Sheets

SYSTEM AND METHOD OF PRECISE WIRE FEED CONTROL IN A WELDER

BACKGROUND OF THE INVENTION

The present invention relates generally to welding-type systems and, more particularly, to a system and method for delivering a welding-type consumable incorporating an electronically commutated motor (ECM) and an electronic commutator control.

Welding-type processes often use consumables, for example, metal wire, to aid in the welding-type process. Consumable delivery systems, such as wire feeders, are typically used to feed metal wire into a weld during a welding process such as Gas Metal Arc Welding (GMAW) and other welding processes. The performance of the consumable delivery system is paramount to the success of the welding-type process being performed. In the example of a wire feeder, precise and accurate delivery of the metal wire being fed to the weld is key to the welding type process. As such, high operational demands are placed on the wire feeder.

Typical wire feeders have a driven roller assembly for driving the consumable metal wire from a feed spindle through a welding gun for introduction to the weld. The drive mechanism in these driven roller assemblies are internally commutated direct current (DC) motors or brushed DC motors. Power is supplied to the brushed DC motor by a welding power source. The amperage or current delivered by the power source governs the speed in which the metal wire is fed to the weld. As such, the brushed DC motors are readily configured for speed control. Generally, the higher the amperage supplied to the wire feeder, the greater the speed by which the wire feeder supplies the metal wire to the weld.

However, performance demands on wire feeders and torches not only require accurate speed but also acceleration, deceleration, and break/breaking control. That is, the consumable wire must be accurately controlled during the welding process and immediately disengaged from the welding-type process upon termination of the process. Failure to accurately control delivery of the consumable wire can result in excessive spatter, puddling on the tip of the wire, and generally less accurate welding. Additionally, the puddling caused by inaccurate breaking may cause increased power consumption at restart.

To aid in the accurate delivery of the wire to the weld, some welders include welding torches incorporating wire delivery engines. In this case, the welding torch does not passively feed the wire through to the weld but includes another motor configured to receive the wire being fed to the torch and aid in its delivery to the weld. In such a case, the wire feeder motor and the torch motor must operate in concert to deliver the consumable metal wire. However, the aforementioned speed control based on amperage (or voltage) is inadequate to provide synchronization between the motors. That is, the design engineer must not only be concerned with delivery speed, but must also consider the torque associated with the delivery, else risk binding or bunching of the wire resulting from synchronization breakdowns between the wire feeder motor and the welding torch motor. As such, torque control of the motors is preferred to avoid such a breakdown.

However, torque control of brushed DC motors can only be achieved indirectly because commutation relying on control of internal brushes can only be controlled by augmenting the current (or voltage) supplied to the motor. As such, algorithms and systems have been developed whereby voltage or current control of the brushed DC motor is coordinated to simulate torque control of the motor. While such systems are able to replicate torque control, responsiveness remains less than desirable.

Accordingly, it would be desirable to have a system and method for improved accuracy and control of welding-type consumable delivery. Furthermore, it would be desirable to incorporate a motor for consumable delivery that can be controlled using torque control schemes for improved control and synchronization between consumable delivery motors. Also, it would be advantageous to have improved accuracy in wirefeed speed control to avoid excessive spatter and weld tip build up.

BRIEF DESCRIPTION OF THE INVENTION

The present invention is directed to a system and method of welding-type consumable delivery that overcomes the aforementioned drawbacks. An electronically commutated motor (ECM) is incorporated into a wire feeder for delivery of the welding consumable. A controller is configured to precisely control the ECM to deliver a welding consumable over a variety of operation conditions and system configurations.

Therefore, in accordance with one aspect of the present invention, a welding-type wire feeder is disclosed that includes at least one ECM configured to deliver a consumable for a welding-type process. The feeder also includes a controller configured to torque control the at least one ECM.

In accordance with another aspect of the present invention, a method of delivering a consumable for a welding-type process is disclosed that includes electronically commutating an ECM to deliver a consumable for a welding-type process. The method also includes monitoring feedback from a consumable delivery mechanism and automatically adjusting the electronic commutation in response to consumable delivery feedback to perform the welding-type process.

In accordance with yet another aspect of the present invention, a welding-type apparatus is disclosed that includes a wire feeder configured to deliver a welding-type consumable to perform a welding-type process. The apparatus also includes a wire feeder ECM configured to drive the wire feeder in at least one of a push and a pull configuration and a motor control configured to control torque of the wire feeder ECM.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The present invention is directed to a system and method for improved delivery of a welding-type consumable. A welding-type wire feeder is included having at least one electronically commutated motor (ECM) configured to deliver a consumable for a welding-type process. A controller is configured to control the ECM over a variety of operational conditions and system configurations.

The present invention will be described with respect to a wire feeder for use with welding systems such as MIG welding and flux cored welding systems. While the present invention will be described with respect to wire feeders, the present invention is equivalently applicable to a wide variety of welding-type process and welding-type consumable delivery systems and may be utilized with respect to various aspects of welding-type devices. As one skilled in the art will fully appreciate, the hereinafter description of welding devices not only includes welders but also includes any system that may require consumable deliver. Therefore, the present invention is applicable to devices including welders, plasma cutters, induction heaters, and the like. Reference to welding power, welding-type power, or welders generally, includes welding, cutting, or heating power. Description of a welding apparatus illustrates just one embodiment in which the present invention may be implemented. The present invention is equivalently applicable with systems such as cutting and induction heating systems.

Figure 1:
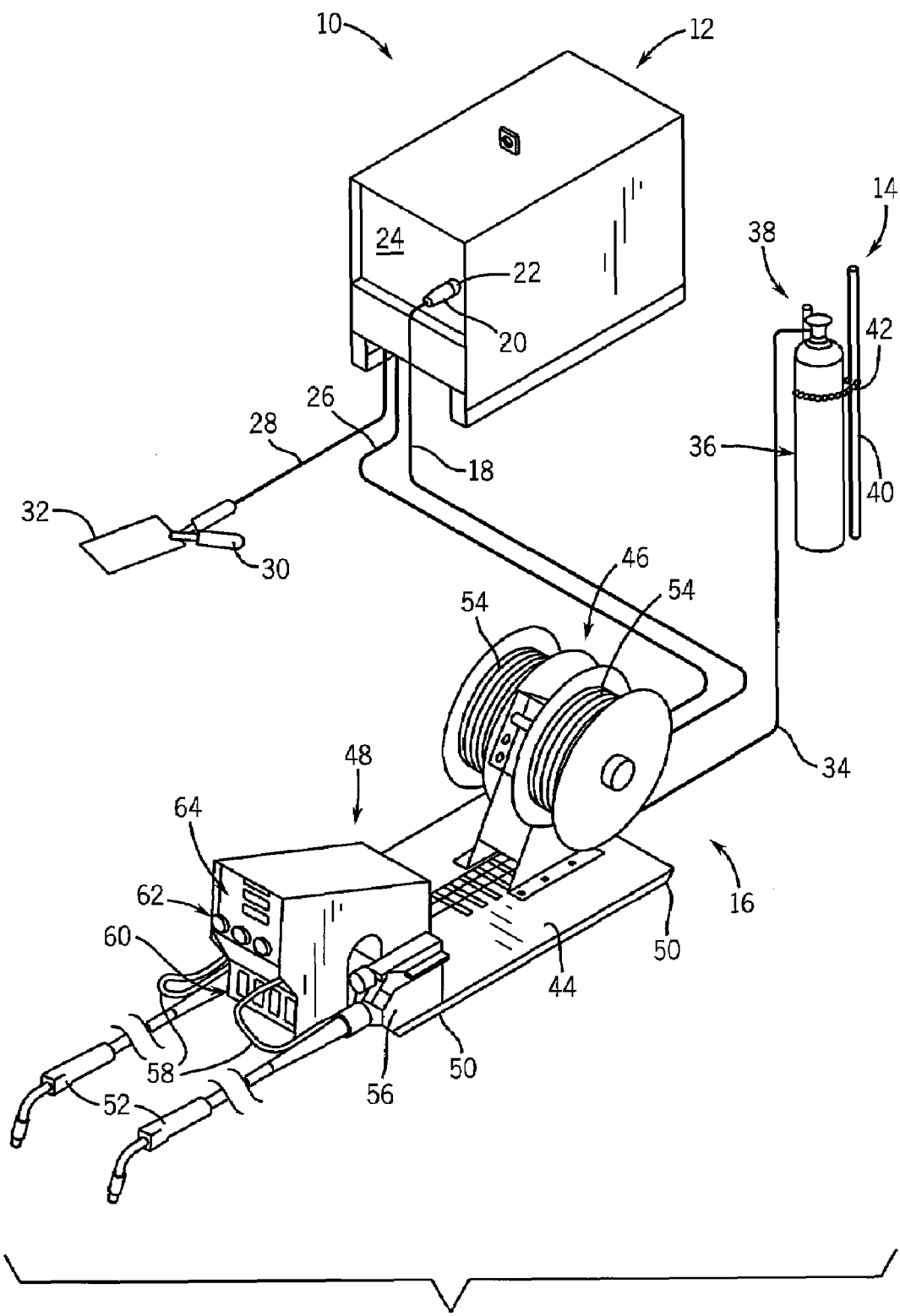
FIG. 1 is a perspective view of an assembled power source and wire feeder combination incorporating the present invention.

Referring now to FIG. 1, a welding system 10 comprises a power source 12, a gas cylinder 14, and a wire feeder assembly 16. The wire feeder 16 is electrically connected to the power source 12 via a control cable 18 wherein the cable 18 includes a pin 20 that engages a corresponding nut 22 on the front panel 24 of the power source 12. Also connected between the power source 12 and the wire feeder 16 is a weld cable 26. The weld cable 26 may be either a positive weld cable or a negative weld cable depending upon the particular welding process. Hereinafter, however, the cable 26 will be described as a positive weld cable. As such, a negative weld cable 28 also extends from the power source 12. The negative weld cable 28 extends from the power source 12 to a clamping member 30 which is configured to hold a workpiece 32. Since the positive weld cable 26 extends to the wire feeder 16 and the negative weld cable 28 extends to the workpiece 32, the requisite voltage potential between the wire feeder 16 and the workpiece 32 necessary for welding is achieved.

Also connected to the wire feeder 16 is a gas hose 34 which supplies gas for an arc-welding process from a gas cylinder 36. The gas cylinder 36 includes a regulator and flow meter 38 and, in the embodiment illustrated in FIG. 1, is securely positioned against a structure 40 via a chain 42.

The wire feeder 16 includes a base plate 44 which is configured to support wire feed spindles 46 and a control box 48. It should be noted that on the undersurface of the base plate 44 are a number of rubber feet 50 that help to limit sliding of the wire feeder 16. In the illustrated embodiment, the wire feeder 16 includes two welding torches 52 which are supplied with a welding wire 54 stored on the wire feed spindles 46 by a corresponding drive roller assembly 56. Each drive assembly 56 is connected to the control box 48 via leads 58. As will be described, the each drive assembly 56 includes an ECM. The control box 48 serves as a control to control the operation of each drive assembly 56 by way of the ECM. While the illustrated embodiment includes multiple torches 52, as will be described with respect to FIG. 2, the current invention is equally applicable with systems utilizing single torch configurations.

Control box 48 includes a number of controls 60 that are used by the welder or technician to conduct the welding process. The switches include jog/purge push buttons and an ON/OFF switch (not shown). Additional controls 62 include knobs that control the wire speed and a left/right switch 64.

Figure 2:
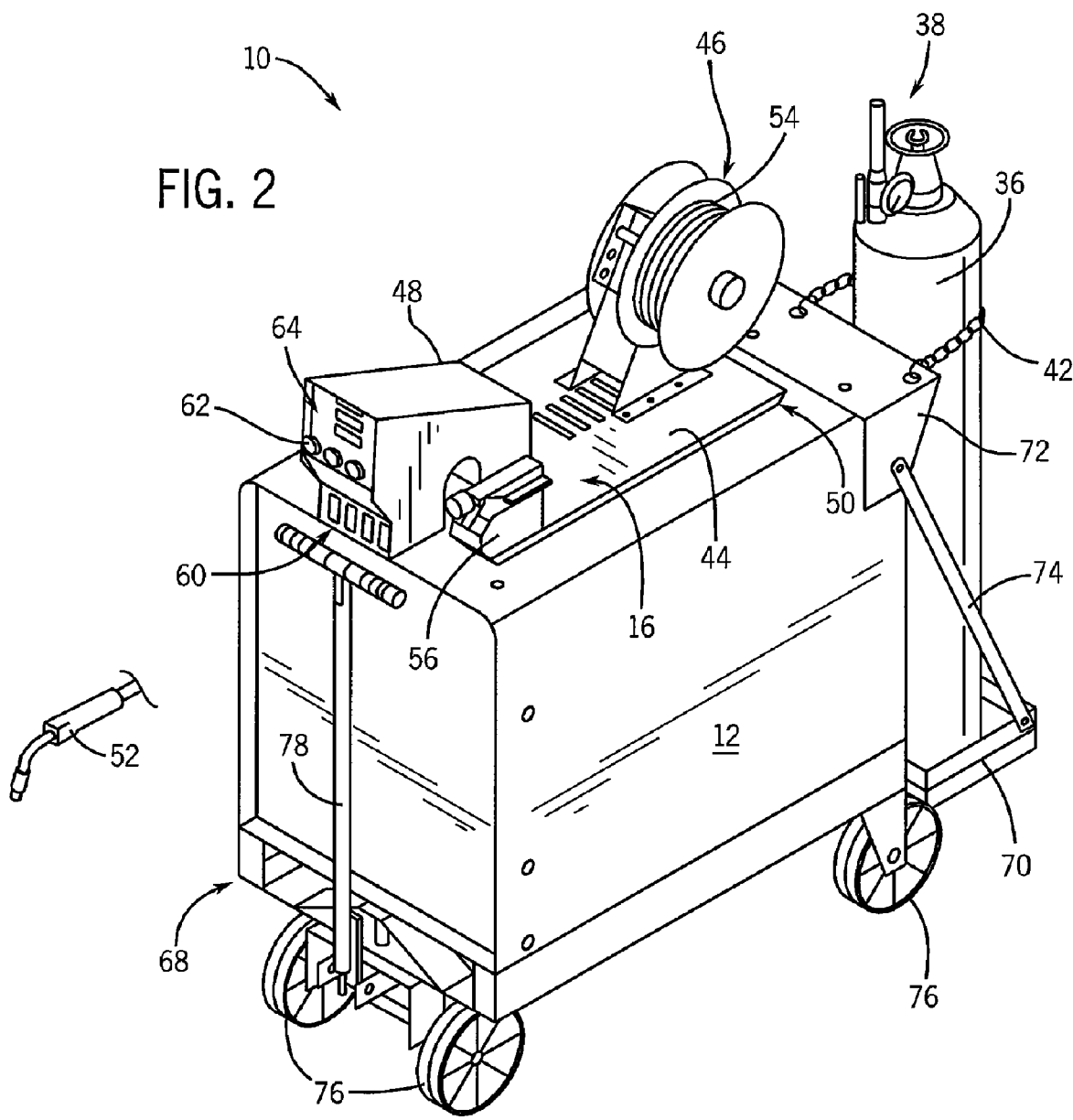
FIG. 2 is a perspective view of an assembled portable embodiment of that shown in FIG. 1.

Referring now to FIG. 2, the aforementioned welding apparatus may also be embodied in a portable system. That is, the wire feeder 16 may be positioned atop the power source 12 and be jointly placed on a pull cart 68. The previously described rubber feet 50 limit sliding movement of the wire feeder 16 when atop the power source 12. The pull cart 68 may also include a cylinder support tray 70 configured to support a gas cylinder 36. In this embodiment, a chain 42 is secured to a plate 72 which is connected to support the tray 70 via a cross-member 74. The plate 72 is designed to be secured to a portion of the power source 12. The pull cart 68 includes wheels 76 and a pulling arm 78 to assist with the transportability of the welding system.

As previously stated, the welding-type system 10 includes a single drive roller assembly 56. The drive roller assembly 56 includes an ECM that is configured to be controlled by the control box 48 to deliver consumable wire 54 from the wire feed spindle 46. As will be described in detail with respect to FIG. 4, the ECM is configured to be torque controlled by the control box 48 such that upon connection of a welding torch 52, including another ECM, to the drive roller assembly 56, the drive roller assembly 56 and welding torch 52 act in concert to deliver the welding wire 54 according to a desired welding-type process. Such a welding torch 52 including an ECM is show in FIG. 3.

Figure 3:
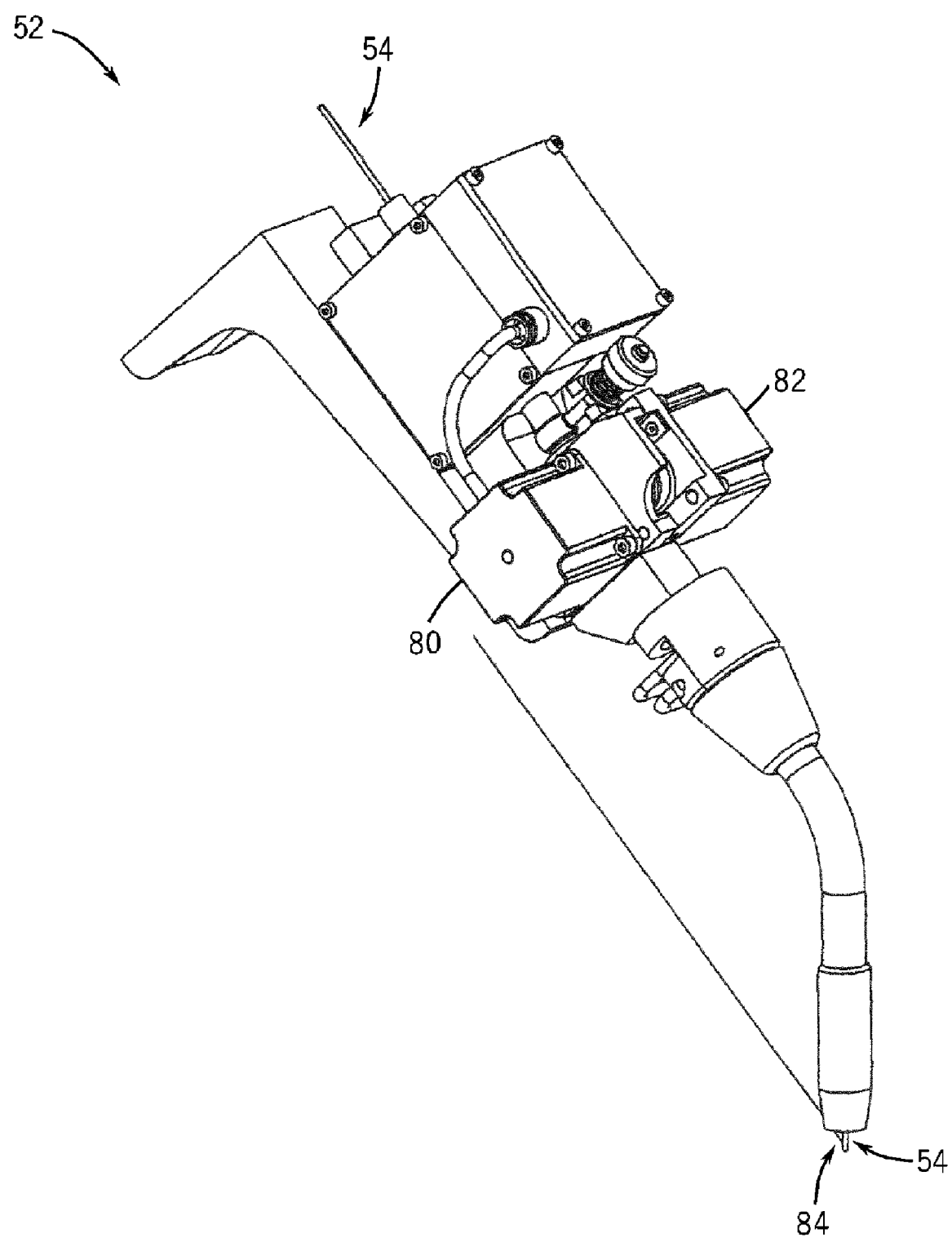
FIG. 3 is a welding-type torch including an electronically commutated motor in accordance with the present invention.

Referring now to FIG. 3, a welding-torch 52 including housings 80, 82 incorporating an ECM is shown. The ECM is configured to drive a consumable wire 54 to or from a weld point 84. The ECM drives paired alignment rollers within the housings 80, 82 to drive the wire from opposite sides of the wire to substantially equalize the driving forces applied to the wire 54.

Figure 4:
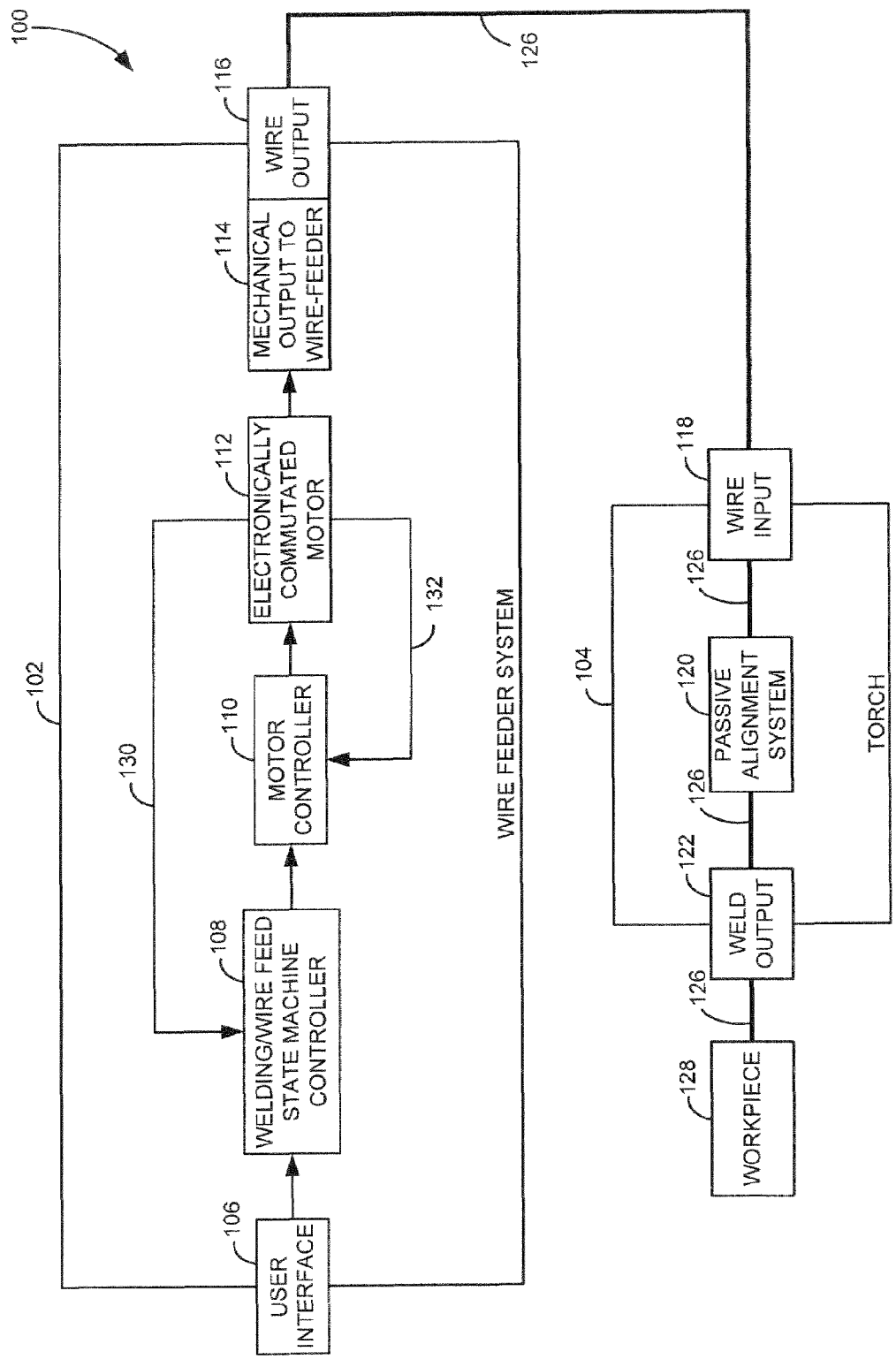
FIG. 4 is a block diagram of a consumable delivery system in accordance with one embodiment the present invention.
Figure 5:
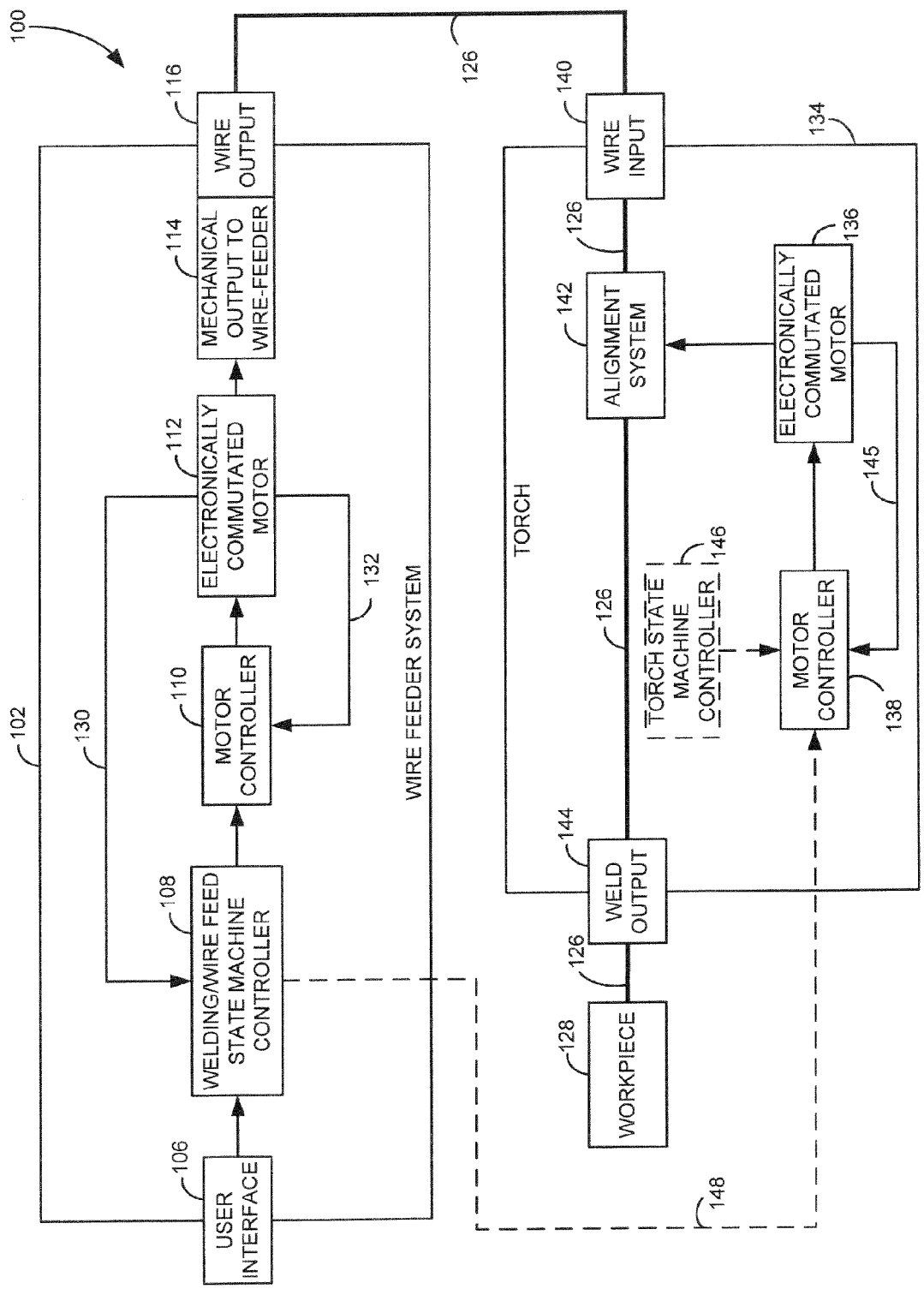
FIG. 5 is a block diagram of a consumable delivery system in accordance with another embodiment of the present invention.

Referring to FIGS. 4 and 5, a system is illustrated that is configured to operate according to a plurality of states including a speed control state, a torque control state, and a pulsed state. FIG. 4 shows a system configured to at least operate according to a speed control state. FIG. 5 shows a system configured to at least operate according to a torque control state. Additionally, as will be described, the systems shown in both FIG. 4 and FIG. 5 may operate according to a pulsed state.

Referring now to FIG. 4, a block diagram is shown illustrating a preferred consumable delivery system configuration 100. The system 100 includes a wire feeder system 102 and a torch 104. The wire feeder system 102 includes a user interface 106, a welding/wire feed state machine controller 108, a motor controller 110, an ECM 112, a mechanical output to the wire feeder 114, and an actual wire output 116. The torch 104 includes a wire input 118, a passive alignment system 120, and a welding output 122. As previously described with respect to FIGS. 1-3, the wire feeder system 102 functions to deliver a consumable wire 126 to the welding torch 104 that, in turn, delivers the consumable wire 126 to effectuate a desired welding-type process upon a workpiece 128. It is contemplated that the ECM 112 may be embodied as a brushless DC motor, a stepping motor, a switched reluctance motor, a variable reluctance motor, or the like.

The user interface 106 includes controls whereby an operator may enter or augment characteristics of a desired welding-type process. Once the operator has set or changed the characteristics for the desired welding-type process through the user interface 106, the user interface 106 communicates those characteristics to the welding/wire feed state machine controller 108. The receipt of the characteristics of the desired welding-type process along with the particular torch 104 attached causes the welding/wire feed state machine controller 108 to enter a particular state and determine specific operational parameters required to effectuate the desired welding-type process. As the torch 104 includes a passive alignment system 120, the welding/wire feed state machine controller 108 selects a speed control state of operation as a default state. However, as will be described with respect to FIG. 5, were the torch 104 to include a driven alignment system, the welding/wire feed state machine controller 108 would select a torque control state. Additionally, as will be described, should the operator select a pulsed welding-type process, the welding/wire feed state machine controller 108 will adjust the state to a pulsed state.

Once a particular state is selected by the welding/wire feed state machine controller 108, the welding/wire feed state machine controller 108 determines the corresponding operational parameters. The operational parameters determined by the welding/wire feed state machine controller 108, which include a wire feed speed, are then communicated to the motor controller 110, which operates as an amplifier. The motor controller 110 receives the operational parameters from the welding/wire feed state machine controller 108 and calculates the specific control constraints for the ECM 112 necessary to deliver the desired wire feed speed. Specifically, the motor controller 110 calculates the commutation parameters necessary to drive the ECM 112 to deliver the desired wire feed speed. The motor controller 110 then begins electronically commutating the ECM 112 whereby the mechanical output of the wire feeder 114 is driven to deliver the consumable wire 126 via the wire output 116.

As previously stated, the consumable wire 126 is fed from the wire feeder system 102 to the torch 104. The consumable wire 126 is received at the wire input 118 of the torch 104 where it is passed to the alignment system 120. The alignment system 120 receives the metal wire and passively positions the consumable wire 126 to pass through the torch 104 to the weld output 122. That is, the alignment system 120 is configured to guide the consumable wire 126 as it passes through the torch 104 but does not drive the consumable wire 126. As the consumable wire 126 is passed from the weld output 122 it is delivered to the workpiece 128 according to known transfer modes.

The wire feeder system 102 includes at least two feedback loops 130, 132 which enable accurate control of the ECM 112. These feedback loops 130, 132 are utilized by the welding/wire feed state machine controller 108 and motor controller 110 to control the operation of the wire feeder 102 to operate according to a desired welding-type process.

The ECM 112 includes a variety of sensors configured to generate feedback regarding the operation of the ECM 112. For example, it is contemplated that Hall Effect sensors may be included within the ECM 112 to send feedback regarding phase pulses. Additionally, it is contemplated that sensors may be included to detect the rotational position/displacement of the rotor or shaft of the ECM 112. Similarly, it is contemplated that sensors may be included to detect and send feedback regarding the speed and the torque of the ECM 112.

A first feedback loop 130 is configured to function to send the feedback derived from the sensors within the ECM 112 to the welding/wire feed state machine controller 108. It is contemplated that the first feedback loop 130 is configured to send feedback including the operational speed of the ECM 112, phase pulses of the ECM 112, and torque of the ECM 112. The welding/wire feed state machine controller 108 then selects and adjusts the operational parameters communicated to the motor controller 110 based on the feedback that corresponds to the current state.

For example, when operating in a speed control state the welding/wire feed state machine controller 108 reviews the wire feed speed feedback to select/adjust the operational parameters. That is, during operation under the speed control state, the welding/wire feed state machine controller 108 receives wire feed speed feedback from the first feedback loop 130 including an actual wire feed speed. The welding/wire feed state machine controller 108 reviews the feedback to determine whether the actual wire feed speed being delivered is outside an operational tolerance range such that the desired welding-type process is not being performed according to the characteristics entered by the operator through the user interface 106. Should the actual wire feed speed deviate from the wire feed speed associated with the characteristics entered by the operator, the welding/wire feed state machine controller 108 augments the operational parameters delivered to the motor controller 110 to compensate for the deviation in wire feed speed. That is, when the adjusted operational parameters are communicated to the motor controller 110, the motor controller 110 suitably augments the commutation of the ECM 112 to adjust the actual wire feed speed to be within the tolerance range.

On the other hand, if operating in a pulsed state, the welding/wire feed state machine controller 108 reviews phase pulse feedback received from the first feedback loop 130 and controls the speed of the ECM 112 and, in turn, the delivery speed of the consumable wire 126. As such, the pulsed delivery mode is controlled by controlling the speed of the ECM 112 and the delivery speed of the consumable wire 126 as opposed to the current applied.

When the welding-type process is complete or a break/breaking occurs, the welding-type system 100 is configured to immediately stop the delivery of the consumable wire 126 and may actually reverse the delivery. Upon determining a break/breaking in the welding-type process, the welding/wire feed state machine controller 108 adjusts the operational parameters of the desired welding-type process to communicate a break/breaking condition to the motor controller 110. In response, the motor controller 110 immediately adjusts the electrical commutation of the ECM 112 to stop the delivery of the consumable wire 126. Additionally, it is contemplated that upon breaking, the motor controller 110 controls commutation of the ECM 112 to stop the delivery of the consumable wire 126 and then reverses commutation of the ECM 112 to reverse the delivery of the consumable wire 126. Therefore, in accordance with one embodiment, upon entering a break/breaking state, the motor controller 110 reverses the commutation of the ECM 112 such that the consumable wire 126 is pulled away from the workpiece 128.

By reversing the consumable wire 126 away from the workpiece 128 upon a break/breaking in the welding-type process, the consumable wire 126 is removed from contact with the molten weld to keep the consumable wire 126 from puddling. That is, during the removal/reversal of consumable wire 126 from the workpiece 128, the tip of the consumable wire 126 is "pinched-off" thereby cleaning the tip of any puddled metal and sharpening the tip. As a result, lower power is required to restart the welding-type process. Furthermore, the clean and sharp consumable wire 126 reduces spatter and allows for a cleaner weld in subsequent welds.

To achieve the aforementioned control of the ECM 112, the motor controller 110 utilizes a second feedback loop 132 that is configured to operate as a commutation feedback loop. During operation, the second loop 132 communicates actual operating parameters of the ECM 112 to the motor controller 110. For example, feedback regarding angular position/displacement of the shaft of the ECM 112 is sent via the commutation feedback loop 132 to the motor control 110. The motor controller 110 constantly monitors the actual operational parameters of the ECM 112 to determine whether the ECM 112 is operating as necessary to comply with the operational parameters sent by the welding/wire feed state machine controller 108 and current operational state of the wire feeder 102. Should the ECM 112 deviate from operational constraints calculated by the motor controller 110, the motor controller 110 immediately adjusts the electrical commutation of the ECM 112 such that the operation of the ECM 112 is within a tolerance range to operate according to the desired welding-type process and current state, as directed by the welding/wire feed state machine controller 108.

Specifically, the motor controller 110 reviews the feedback received via the second feedback loop 132 along with the operational parameters sent by the welding/wire feed state machine controller 108 to determine whether the electronic commutation of the ECM 112 should be adjusted to increase the speed of the ECM 112, decrease the speed of the ECM 112, or reverse the direction of the ECM 112. The motor controller 110 also uses the feedback received via the commutation feedback loop 132 to accurately control the ECM 112 to advance or retract the consumable wire 126 a particular increment by monitoring the angular displacement of the shaft of the ECM 112.

Therefore, the first feedback loop 130 and the second feedback loop 132 provide the welding/wire feed state machine controller 108 and motor controller 110 with feedback necessary to effectuate sophisticated state control and break/breaking control algorithms. The wire feeder system 102 is able to dynamically adjust to changes in operational conditions or states to implement a robust control scheme.

Referring now to FIG. 5, the welding system 100 is shown in an alternate configuration that includes a torch 134 having an ECM 136 and an associated motor controller 138 besides the previously described wire input 140, alignment system 142, and weld output 144. The ECM 136 is configured to drive the alignment system 142. Accordingly, a driven alignment system is created including the ECM 136, associated motor controller 138, and alignment system 142. The driven alignment system, unlike the passive alignment system described with respect to FIG. 4, is configured to pull the consumable wire 126 to deliver it to the weld output 144. A commutation feedback loop 145 is provided to send operational feedback from the ECM 136 to the motor controller 138

In this configuration, the welding-type system 100 is configured to operate according to a torque control state or the previously described pulsed state. Specifically, upon engaging the wire feeder system 102 with the torch 134, the welding/wire feed state machine 108 changes the wire feeder state to a torque control state. Specifically, once the torch 134 including the ECM 136 is attached, a push/pull configuration is created. As will be described, the welding/wire feed state machine 108 of the wire feeder system 102 switches the current state to a torque control state which causes the ECM 112 to be torque controlled to push the consumable wire 126 to the torch 134. Similarly, the ECM 136 of the torch 134 is controlled by the motor controller 138 to pull the consumable wire 126 through the torch 134.

That is, when two or more ECMs 112, 136 are configured to deliver the consumable wire 126, a push/pull configuration is created. As is known, in such push/pull configuration there is a potential for undue stress to be placed upon the consumable wire 126 or for the consumable wire 126 to bind if the ECM 112 of the wire feeder system 102 and the ECM 136 of the torch 134 are not operating in concert. To alleviate the potential for these undesirable conditions, the wire feeder system 102 switches to a torque control configuration whereby the torque of the ECM 112, and indirectly the consumable wire 126, is monitored and the operation of the ECM 112 is adjusted accordingly.

Therefore, to achieve a push/pull operational configuration, the ECMs 112, 124 are torque controlled. Upon connection of the torch 134 that includes the ECM 136, the wire feeder system 102 dynamically adjust to torque control the ECM 112 of the wire feeder system 102. Specifically, the welding/wire feed state machine 108 switches the current state to a torque control state and reviews the torque feedback received from the first feedback loop 130 that, as described with respect to FIG. 4, provides torque feedback as well as a variety of other feedback regarding the ECM 112.

The first feedback loop 130 continuously sends feedback regarding the torque of the ECM 112 to the welding/wire feed state machine 108. The torque feedback is reviewed by the welding/wire feed state machine 108 to determine whether the current operational parameters are such that there is a potential for undue stress or binding upon the consumable wire 126.

If the torque feedback delivered via the first feedback loop 130 is indicative of undue stress on the consumable wire 126, the ECM 112 of the wire feeder system 102 is not "pushing" fast enough to keep up with the "pulling" of the ECM 136 of the torch 134. Accordingly, the welding/wire feed state machine 108 determines that a potential exists for undue stress on the consumable wire 126 and adjusts the operational parameters to compensate accordingly. In response, the motor controller 110 adjusts the electronic commutation of the ECM 112 to synchronize the "pushing" and "pulling."

On the other hand, if the torque feedback is indicative of a potential for binding of the consumable wire 126, the ECM 112 of the wire feeder system 102 is "pushing" faster than the "pulling" of the ECM 136 of the torch 134. Accordingly, the welding/wire feed state machine 108 determines that a potential exists for binding of the consumable wire 126 and adjusts the operational parameters to compensate accordingly. In response, the motor controller 110 adjusts the electrical commutation of the ECM 112 to synchronize the "pushing" and "pulling."

Furthermore, upon entering a break/breaking state, as triggered by a break/breaking in the welding-type process, the welding/wire feed state machine controller 108 changes the operational parameters to stop the delivery of consumable wire 126. As described with respect to FIG. 4, a break/breaking causes the motor controller 110 to control the ECM 112 to immediately stop the delivery of consumable wire 126. In accordance with one embodiment, once delivery of the consumable wire 126 ceases, the ECM 112 is reverse commutated to reverse and withdraw the consumable wire 126 from the workpiece 128. However, with respect to FIG. 5, when the torch 134 including the ECM 136 is connected within the welding system 100, additional controls are necessary to control the ECM 136 of the torch 134 to effectuate the desired breaking/reversing response. Therefore, it is contemplated that the welding/wire feed state machine controller 108 may be configured to determine the state of only the wire feeder system 102 or may determine the state of the entire welding system 100.

If the welding/wire feed state machine controller 108 is configured to only determine the state of the wire feeder system 102, a torch state machine controller 146 (shown in phantom) is included in the torch 134 to determine the state of the torch 134. In this case, upon receiving an indication of a break/breaking in the welding-type process, the welding/wire feed state machine controller 108 and torch state machine controller 146 change operational parameters of the wire feeder system 102 and the torch 134, respectively. Accordingly, the wire feeder system 102 motor controller 110 and the torch 134 motor controller 138 respond to the change in operating parameters by adjusting the electronic commutation of each respective ECM 112, 136 to stop and ultimately reverse the delivery of the consumable wire 126.

On the other hand, should no torch state machine controller be present, the welding/wire feed state machine controller 108 serves as a welding system state machine controller by providing dual functionality as the state machine controller of the wire feeder system 102 and the torch 134. Changes in the operational parameters are communicated from the welding/wire feed state machine controller 108 to the motor controller 138 of the torch 134 via a communications line 148 (shown in phantom). As such, a single welding/wire feed state machine controller 108 determines the operational parameters of the welding system 100 and each motor controller 110, 138 electronically commutates the ECMs 112, 136 responsive thereto.

Additionally, if operating in a pulsed state, the welding/wire feed state machine controller 108 reviews the phase pulse feedback as well as the torque feedback to control both the speed of the ECMs 112, 136 and the torque of the ECM 112, 136. Accordingly, the delivery speed of the consumable wire 126 is controlled in a two-fold manner whereby torque control is utilized to alleviate potential binding or undue stress on the consumable wire 126 and speed control is utilized to control the delivery speed of the consumable wire to control the desired pulsed delivery mode. That is, the pulsed delivery mode is controlled by controlling the speed of the ECMs 112, 136 and the delivery speed of the consumable wire 126.

In any case, a system 100 of actual torque control is achieved. The ECM 112 of the wire feeder system 102 and the ECM 136 of the torch 134 operate in concert to deliver the consumable wire 126 according to a desired welding-type process.

As indicated previously, the present invention has been described with particularity to a wire feeder of a welding system. However, the present invention is equivalently applicable to other machines and systems such as welders, plasma cutters, induction heaters, and the like. Reference to welding power, welding-type power, or welders generally, includes welding, cutting, or heating power.

Therefore, in accordance with one embodiment of the present invention, a welding-type wire feeder includes at least one electronically commutated motor (ECM) configured to deliver a consumable for a welding-type process. The feeder also includes a controller configured to torque control the at least one ECM.

In accordance with another embodiment of the present invention, a method of delivering a consumable for a welding-type process includes electronically commutating an ECM to deliver a consumable for a welding-type process. The method also includes monitoring feedback from a consumable delivery mechanism and automatically adjusting the electric commutation in response to consumable delivery feedback to perform the welding-type process.

In accordance with yet another embodiment of the present invention, a welding-type apparatus includes a wire feeder configured to deliver a welding-type consumable to perform a welding-type process. The apparatus also includes a wire feeder ECM configured to drive the wire feeder in at least one of a push operation and a pull operation and a motor control configured to control torque of the wire feeder ECM.

The present invention has been described in terms of the preferred embodiment, and it is recognized that equivalents, alternatives, and modifications, aside from those expressly stated, are possible and within the scope of the appending claims.

What is claimed is:

1. A welding-type wire feeder comprising:
   at least one electronically commutated motor (ECM) configured to deliver a consumable for a welding-type process; and
   a controller configured to control the at least one ECM, wherein the controller is programmed to switch control of the at least one ECM between any one of torque control, voltage control, current control, constant velocity control, and position control.

2. The welding-type wire feeder of claim 1 further comprising a commutation feedback loop configured to deliver commutation feedback from the at least one ECM to the controller.

3. The welding-type wire feeder of claim 1 wherein the controller is configured to control the at least one ECM to coordinate operation with a motor disposed within a welding-type torch to perform a push-pull consumable delivery process.

4. The welding-type wire feeder of claim 3 wherein the at least one ECM is controlled by the controller to push the consumable and the ECM disposed within the welding-type torch is controlled to pull the consumable.

5. The welding-type wire feeder of claim 3 wherein the motor disposed within the welding-type torch includes an ECM.

6. The welding-type wire feeder of claim 1 wherein the controller is configured to regulate torque of the at least one ECM to perform torque control to deliver the consumable for the welding-type process.

7. The welding-type wire feeder of claim 1 wherein the controller is configured to perform angular displacement control to regulate the at least one ECM to perform the welding-type process.

8. The welding-type wire feeder of claim 1 further comprising a sensor configured to determine a rotational direction of the at least one ECM.

9. The welding-type wire feeder of claim 8 wherein the controller is configured to receive feedback from the sensor to control the at least one ECM to change operation from forward operation to reverse operation for a given period upon receiving a command to end delivery of the consumable for the welding-type process.

10. The welding-type wire feeder of claim 9 wherein reverse operation is performed for given period to remove the consumable a predetermined distance away from a workpiece.

11. The welding-type wire feeder of claim 1 wherein the welding-type process is a pulsed welding-type process.

12. The welding-type wire feeder of claim 11 wherein the sensor is a Hall effect sensor configured to detect electrical pulses generated by the at least one ECM to control the delivery of the consumable to control the pulsed welding-type process.

13. The welding-type wire feeder of claim 1 wherein the controller is further configured to control the at least one ECM according to at least one of a plurality of states.

14. The welding-type wire feeder of claim 13 wherein the states include a speed control state, a torque control state, a pulsed control state, a constant velocity state, and a position control state.

15. The welding-type wire feeder of claim 13 further comprising a state controller configured to generate operating parameters corresponding to a current state and communicate the operating parameters to the controller to control the at least one ECM according to the operating parameters.

16. The welding-type wire feeder of claim 1 wherein the at least one ECM includes at least one of a brushless DC motor, a stepping motor, a switched reluctance motor, and a variable reluctance motor.

17. A method of delivering a consumable for a welding-type process comprising:
electronically commutating an ECM to deliver a consumable for a welding-type process;
monitoring feedback from at least a select one of a number of feedback sensors arranged about a consumable delivery mechanism; and
automatically adjusting the electronic commutation of the ECM in response to the selected sensor and resulting consumable delivery feedback to perform the welding-type process.

18. The method of claim 17 wherein delivery of a consumable includes at least one of a push operation and a pull operation.

19. The method of claim 17 further comprising receiving commutation feedback from the ECM to automatically adjust the electric commutation.

20. The method of claim 17 further comprising controlling a delivery speed of the consumable to control a pulsed welding-type process.

21. The method of claim 17 further comprising reversing the delivery of the consumable upon at least one of a break in the welding-type process and a completion of the welding-type process.

22. The method of claim 17 further comprising monitoring an angular displacement of a shaft of the ECM and regulating the electronic commutating to control the delivery of the consumable based on the angular displacement of the ECM shaft.

23. The method of claim 17 further comprising automatically detecting another ECM and controlling operation of the ECMs to perform a push-pull delivery of the consumable.

24. The method of claim 23 further comprising coordinating operation of the ECMs to perform at least one of a user-prompted acceleration, deceleration, and braking.

25. The method of claim 23 further comprising monitoring user input and coordinating operation of the ECMs to perform a braking operation including reversing delivery of the consumable away from a workpiece.

26. A welding-type apparatus comprising:
a wire feeder configured to deliver a welding-type consumable to perform a welding-type process;
a wire feeder ECM configured to drive the wire feeder according to at least one of a push configuration and a pull configuration; and
a motor control configured to control the wire feeder ECM
a controller configured to detect the welding-type torch ECM and automatically switch a control state from one of a voltage regulation state and a current regulation state to a torque regulation state.

27. The apparatus of claim 26 further comprising:
a welding-type torch configured to perform the welding-type process; and
a welding-type torch ECM configured to receive the consumable from the wire feeder ECM and deliver the consumable to a workpiece.

28. The apparatus of claim 27 wherein the welding-type process includes at least one of a metal inert gas (MIG) welding-type process, tungsten inert gas (TIG) welding-type process, a shielded metal arc welding (SMAW) welding-type process, an induction heating process, and a plasma-cutting process.

29. The apparatus of claim 26 wherein the controller is further configured to coordinate control of the wire feeder ECM and welding-type torch ECM to perform a push-pull consumable delivery process.

30. The apparatus of claim 26 wherein the controller is configured to receive commutation feedback from the ECM.

31. The apparatus of claim 26 wherein the controller is configured to torque control the wire feeder ECM and welding-type torch ECM.

32. A method of delivering a consumable for a welding-type process comprising:
electronically commutating an ECM to deliver a consumable for a welding-type process;
selecting at least one of a number of feedback sensors based on a current control state of the ECM;
monitoring feedback from the selected at least one feedback sensors arranged about a consumable delivery mechanism; and
automatically adjusting the electronic commutation of the ECM in response to the selected sensor and resulting consumable delivery feedback to perform the welding-type process.

33. The method of delivering a consumable for a welding-type process of claim 32 further comprising:
changing an ECM operation from forward operation to reverse operation for a given period in response to receiving a command to end delivery of the consumable for the welding-type process.

34. The method of delivering a consumable for a welding-type process of claim 32 further comprising:
changing the current control state of the ECM to a subsequent control state, wherein the current control state and the subsequent control state are one of:
a speed control state, a torque control state, a pulsed control state, a constant velocity state, and a position control state.

35. The method of delivering a consumable for a welding-type process of claim 34 further comprising:
generating operating parameters corresponding to the current control state;
communicating the operating parameters to control the at least one ECM according to the operating parameters;
generating subsequent operating parameters corresponding to the subsequent control state; and
communicating the subsequent operating parameters to control the at least one ECM according to the subsequent operating parameters.

* * * * *